United States Patent
Dawson et al.

(10) Patent No.: US 9,514,318 B2
(45) Date of Patent: *Dec. 6, 2016

(54) DYNAMIC ACCESS CONTROL FOR DOCUMENTS IN ELECTRONIC COMMUNICATIONS WITHIN A NETWORKED COMPUTING ENVIRONMENT

(75) Inventors: Christopher J. Dawson, Arlington, VA (US); Michael D. Kendzierski, New York, NY (US); Stephen McMillan, Weston, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,642

(22) Filed: Jul. 8, 2011

(65) Prior Publication Data
US 2011/0258234 A1 Oct. 20, 2011

Related U.S. Application Data

(63) Continuation of application No. 12/630,121, filed on Dec. 3, 2009, now abandoned.

(51) Int. Cl.
*G06F 17/30* (2006.01)
*G06F 21/62* (2013.01)
(Continued)

(52) U.S. Cl.
CPC ......... *G06F 21/6209* (2013.01); *G06F 21/604* (2013.01); *H04L 51/14* (2013.01); *H04L 51/18* (2013.01); *H04L 51/066* (2013.01)

(58) Field of Classification Search
CPC ................................ G06F 17/30; G06F 17/00
See application file for complete search history.

(56) References Cited

U.S. PATENT DOCUMENTS 6,275,850 B1    8/2001 Beyda et al.
6,505,236 B1 *  1/2003 Pollack ............... G06Q 10/107
                                                        709/200

(Continued)

FOREIGN PATENT DOCUMENTS

EP              838774 A2 *   4/1998
EP    PCT 2010067509          3/2009
WO       01/75651 A2         10/2001

OTHER PUBLICATIONS

"E-Mail Management Services", Law.lexisnexis.com, 2006 (author not noted).

(Continued)

*Primary Examiner* — Farhan Syed
(74) *Attorney, Agent, or Firm* — William H. Hartwell; Madeline F. Schiesser; Keohane & D'Alessandro PLLC

(57) ABSTRACT

The present invention provides an approach to manage and control document transmission and electronic communication. Specifically, the present invention provides control over data associated with multiple types of data communication. Along these lines, embodiments of the present invention provide a hub and spoke communication model in order to achieve multiple benefits in terms of effectiveness, efficiency, flexibility, and control. This type of granular control is critical for information sharing within a networked computing environment. This approach is also useful for collaboration tools and can be augmented by the creation and management of access control lists (ACL's) for the hub-spoke system. To this extent, embodiments of the present invention provide functionality to automatically update ACL's as documents are being forwarded or otherwise communicated between multiple parties. These ACL's are kept up to date through the analysis of to whom (and where) a document has been sent.

20 Claims, 5 Drawing Sheets

(51) Int. Cl.
*G06F 21/60* (2013.01)
*H04L 12/58* (2006.01)

(56) References Cited

U.S. PATENT DOCUMENTS

| | | | |
|---|---|---|---|
| 6,505,237 B2 | 1/2003 | Beyda et al. | |
| 7,054,905 B1 | 5/2006 | Hanna et al. | |
| 7,076,558 B1* | 7/2006 | Dunn | G06F 21/6218 709/225 |
| 7,130,474 B2 | 10/2006 | Luo et al. | |
| 7,367,048 B2* | 4/2008 | Kelley | G06F 21/6218 705/59 |
| 7,409,425 B2 | 8/2008 | Naick et al. | |
| 7,434,048 B1 | 10/2008 | Shapiro et al. | |
| 7,454,459 B1* | 11/2008 | Kapoor | G06Q 10/06 707/999.202 |
| 7,844,998 B2* | 11/2010 | Kelley | G06F 21/6218 705/59 |
| 7,877,451 B2 | 1/2011 | Portilla | |
| 7,912,971 B1* | 3/2011 | Dunn | H04L 63/102 709/203 |
| 2002/0016818 A1 | 2/2002 | Kirani et al. | |
| 2005/0010799 A1* | 1/2005 | Kelley | G06Q 10/10 726/22 |
| 2005/0013462 A1* | 1/2005 | Rhoads | G06F 17/30876 382/100 |
| 2005/0108335 A1 | 5/2005 | Naick et al. | |
| 2007/0005595 A1 | 1/2007 | Gafter | |
| 2007/0033654 A1* | 2/2007 | Wilson | G06F 21/604 726/27 |
| 2007/0038765 A1* | 2/2007 | Dunn | G06F 21/6218 709/229 |
| 2007/0143827 A1* | 6/2007 | Nicodemus | G06F 21/6218 726/2 |
| 2007/0143851 A1* | 6/2007 | Nicodemus | G06F 21/55 726/25 |
| 2007/0255743 A1 | 11/2007 | Gaucas | |
| 2008/0033955 A1* | 2/2008 | Fujii | G06F 21/6218 |
| 2008/0091613 A1 | 4/2008 | Gates et al. | |
| 2008/0104393 A1 | 5/2008 | Glasser et al. | |
| 2008/0147679 A1* | 6/2008 | Kelley | G06Q 10/10 |
| 2009/0228950 A1 | 9/2009 | Reed et al. | |
| 2009/0235087 A1 | 9/2009 | Bird | |
| 2009/0257596 A1 | 10/2009 | Piccinini et al. | |
| 2010/0131604 A1 | 5/2010 | Portilla | |
| 2010/0325208 A1* | 12/2010 | Chitturi | H04L 67/2804 709/204 |
| 2010/0325225 A1* | 12/2010 | Petronijevic | H04L 67/2804 709/206 |
| 2011/0119732 A1* | 5/2011 | Dunn | H04L 63/102 726/1 |
| 2011/0137947 A1 | 6/2011 | Dawson et al. | |

OTHER PUBLICATIONS

Buda, C., "Innovative Email Attachment Management Solution Launched by Messaging Architects", Aug. 19, 2008, www.securitysoftwarezone.com.

Feinberg, J., "E-Mail Management Services", domino.watson.ibm.com (unknown date).

"PBwiki Adds Document Management, Unlimited Storage", Dec. 8, 2008, www.itworld.com.

"Email Management", 2006 FileSphere Pty Limited—a member of the Neurocom Group.

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Feinberg, Jonathan, "Cattail: Person-Centrick Sharing for IBMers", IBM Watson Research Center, Jan. 5, 2013, 1 page.

Maitland, J., "Keeping Control Isn't Easy", Chapter 4: Cloud-Based Infrastructure, SearchCloudComputing.com, Publication Date: Oct. 2009, 19 pages.

Farhan, U.S. Appl. No. 12/630,121, Office Action dated Aug. 31, 2011, 20 pages.

Farhan, U.S. Appl. No. 12/630,121, Final Office Action dated Apr. 10, 2012, 18 pages.

Martin, Application No. GB1204644.7, Examination Report, Dec. 16, 2015, 3 pages.

Zhai Da Cheng, Information Materials for IDS, SIPO Office Action Apr. 1, 2014, 2 pages.

\* cited by examiner

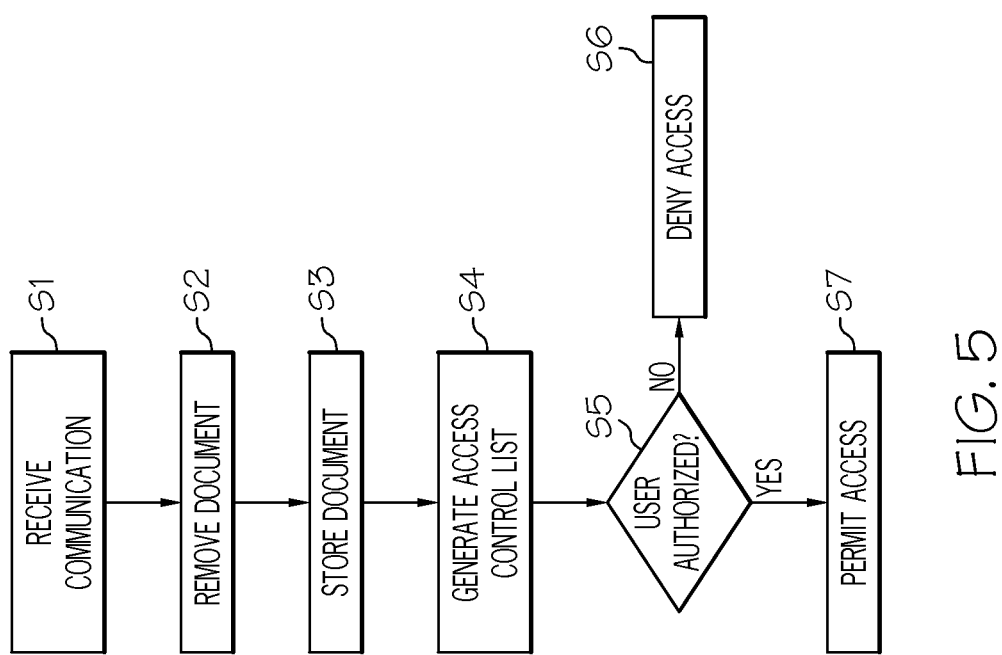

US 9,514,318 B2

DYNAMIC ACCESS CONTROL FOR DOCUMENTS IN ELECTRONIC COMMUNICATIONS WITHIN A NETWORKED COMPUTING ENVIRONMENT

CROSS-REFERENCE TO RELATED APPLICATION

This application is a continuation of, and claims the benefit of, co-pending and co-owned U.S. patent application Ser. No. 12/630,121, filed Dec. 3, 2009, the entire contents of which are herein incorporated by reference.

FIELD OF THE INVENTION

The present invention generally relates to access control. Specifically, the present invention relates to dynamic access control for documents in electronic communications (e.g., email) within a Cloud computing environment.

BACKGROUND OF THE INVENTION

As electronic communications (e.g., email, instant messaging, etc.) continue to become the standard of business and personal communications, the need for access control to such communications grows. Consider, for example, email, where the originator/sender has no control over where the email message and/or a document attached thereto may be sent (and resent) and who can access the content once it is distributed. Storing multiple documents in multiple places (for example, different email in-boxes) may put undue processing and storage capacity on both servers and networks. Existing solutions concentrate on sending the metadata associated with documents rather than providing access control. Moreover, under existing solutions, once a person has sent a document to another person, the only way an originator/sender may restrict who receives the document (by multiple forwarding) is through 'prevent copying' or other such feature that prohibits the resending of the document in its original form. Such an approach is very restrictive and places the burden on the electronic mail desktop client.

SUMMARY OF THE INVENTION

The present invention provides a solution to manage and control document transmission and electronic communication. Specifically, the present invention solves the problem of having control over data (documents, image files, and attachments hereafter referenced as "documents") that are associated with multiple types of data communication. Along these lines, the present invention provides a hub and spoke communication model in order to achieve multiple benefits in terms of effectiveness, efficiency, flexibility, and control. This type of granular control is critical for information sharing within a networked computing environment. This approach is also useful for collaboration tools and can be augmented by the creation and management of access control lists for the hub-spoke system. To this extent, this present invention solves the problem of being able to automatically update access control lists as documents are being forwarded or otherwise communicated between multiple people. These ACL's are kept up to date through the analysis of to whom (and where) a document has been sent.

A first aspect of the present invention provides a method for providing dynamic access control to documents in electronic communications within a networked computing environment, comprising: receiving an electronic communication within the networked computing environment, the electronic communication having a document; removing the document from the electronic communication; storing the document in a document database; generating an access control list for the document as stored, the access control list identifying a sender and a set of initial recipients of the electronic communication; dynamically updating the access control list to include a set of forwarded recipients based upon a forwarding of the electronic communication by at least one of the set of initial recipients; and controlling access to the document in the document database based upon the access control list.

A second aspect of the present invention provides a networked computer system for providing dynamic access control to documents in electronic communications, comprising: a memory medium comprising instructions; a bus coupled to the memory medium; and a processor coupled to the bus that when executing the instructions causes the networked computer system to: receive an electronic communication within the networked computing environment, the electronic communication having a document; remove the document from the electronic communication; store the document in a document database; generate an access control list for the document as stored, the access control list identifying a sender and a set of initial recipients of the electronic communication; dynamically update the access control list to include a set of forwarded recipients based upon a forwarding of the electronic communication by at least one of the set of initial recipients; and control access to the document in the document database based upon the access control list.

A third aspect of the present invention provides a computer readable storage device comprising: a program for providing dynamic access control to documents in electronic communications within a networked computing environment, the computer readable storage device comprising program code for causing a networked computer system to: receive an electronic communication within the networked computing environment, the electronic communication having a document; remove the document from the electronic communication; store the document in a document database; generate an access control list for the document as stored, the access control list identifying a sender and a set of initial recipients of the electronic communication; dynamically update the access control list to include a set of forwarded recipients based upon a forwarding of the electronic communication by at least one of the set of initial recipients and control access to the document in the document database based upon the access control list.

A fourth aspect of the present invention provides a method for deploying a networked service for providing dynamic access control to documents in electronic communications within a networked computing environment, comprising: providing a networked computer infrastructure being operable to: receive an electronic communication within the networked computing environment, the electronic communication having a document; remove the document from the electronic communication; store the document in a document database; generate an access control list for the document as stored, the access control list identifying a sender and a set of initial recipients of the electronic communication; dynamically update the access control list to include a set of forwarded recipients based upon a forwarding of the electronic communication by at least one of the set of initial recipients and control access to the document in the document database based upon the access control list.

BRIEF DESCRIPTION OF THE DRAWINGS

These and other features of this invention will be more readily understood from the following detailed description of the various aspects of the invention taken in conjunction with the accompanying drawings in which:

FIG. 5 shows a flow diagram of a method according the present invention.

Figure 1:
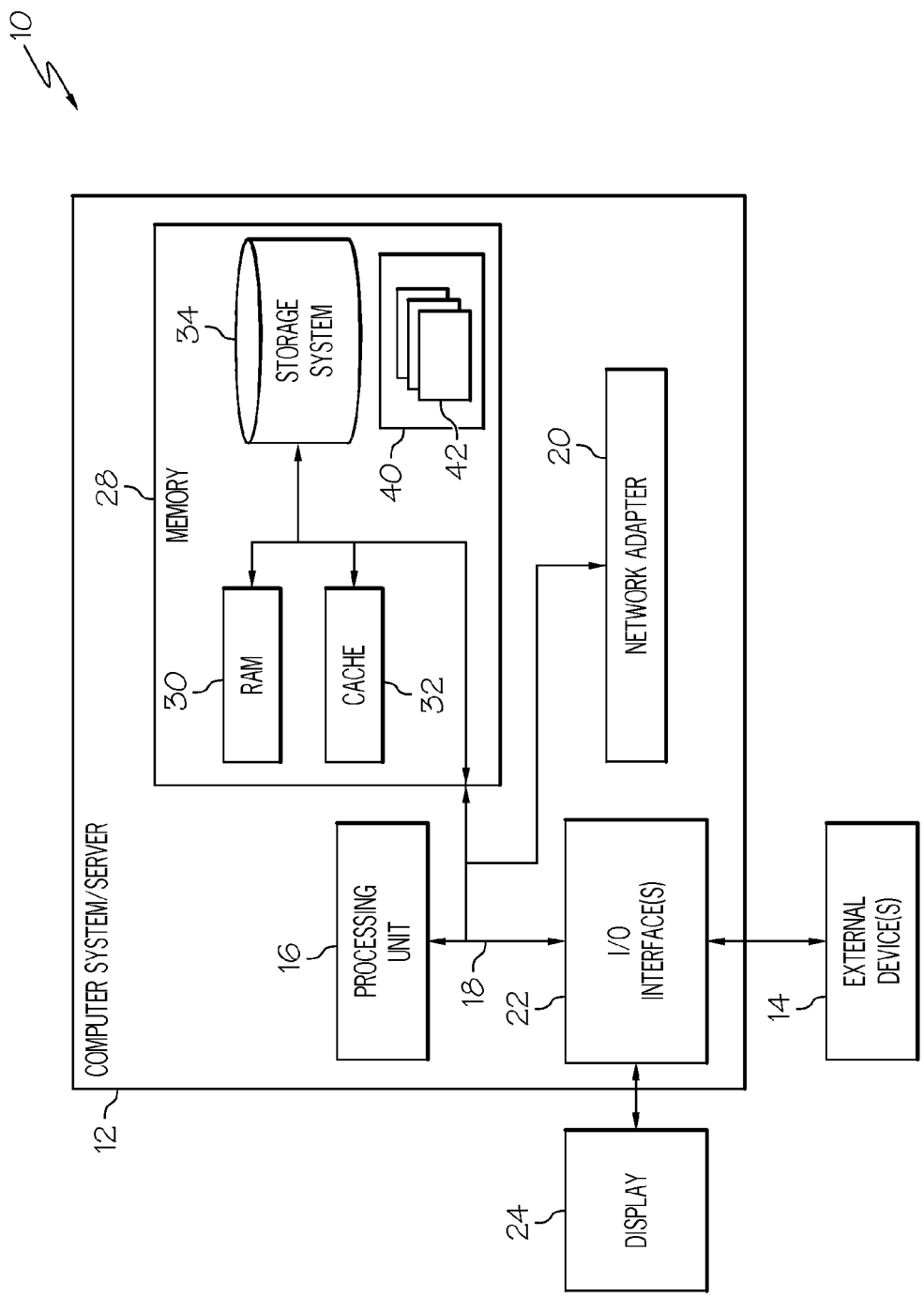
FIG. 1 shows a Cloud system node according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. Cloud Computing Definitions
II. Detailed Implementation of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is comprised of at least five characteristics, at least three service models, and at least four deployment models.

Characteristics are as follows:

On-demand self-service: A consumer can unilaterally provision computing capabilities, such as server time and network storage, as needed automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Cloud Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: The cloud infrastructure is operated solely for an organization. It may be managed by the organization or a third party and may exist on-premises or off-premises.

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability.

II. Implementation of the Invention

The present invention provides a solution to manage and control document transmission and electronic communication. Specifically, the present invention solves the problem of having control over data (documents, image files, and attachments)—hereafter referenced as "Documents" that are associated with multiple types of data communication.

Along these lines, the present invention provides a hub and spoke communication model in order to achieve multiple benefits in terms of effectiveness, efficiency, flexibility, and control. This type of granular control is critical for information sharing within a networked computing environment, e.g., a Cloud computing environment. This approach is also useful for collaboration tools and can be augmented by the creation and management of access control lists (ACL) for the hub-spoke system. To this extent, this present invention solves the problem of being able to automatically update ACL's as documents are being forwarded or otherwise communicated between multiple people. These ACL's are kept up to date through the analysis of to whom (and where) a document has been sent.

Referring now to FIG. 1, a schematic of an exemplary cloud computing node is shown. Cloud computing node 10 is only one example of a suitable cloud computing node and is not intended to suggest any limitation as to the scope of use or functionality of the invention described herein. Regardless, cloud computing node 10 is capable of being implemented and/or performing any of the functions set forth in section I above.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on that perform particular tasks or implement particular abstract data types. The exemplary computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
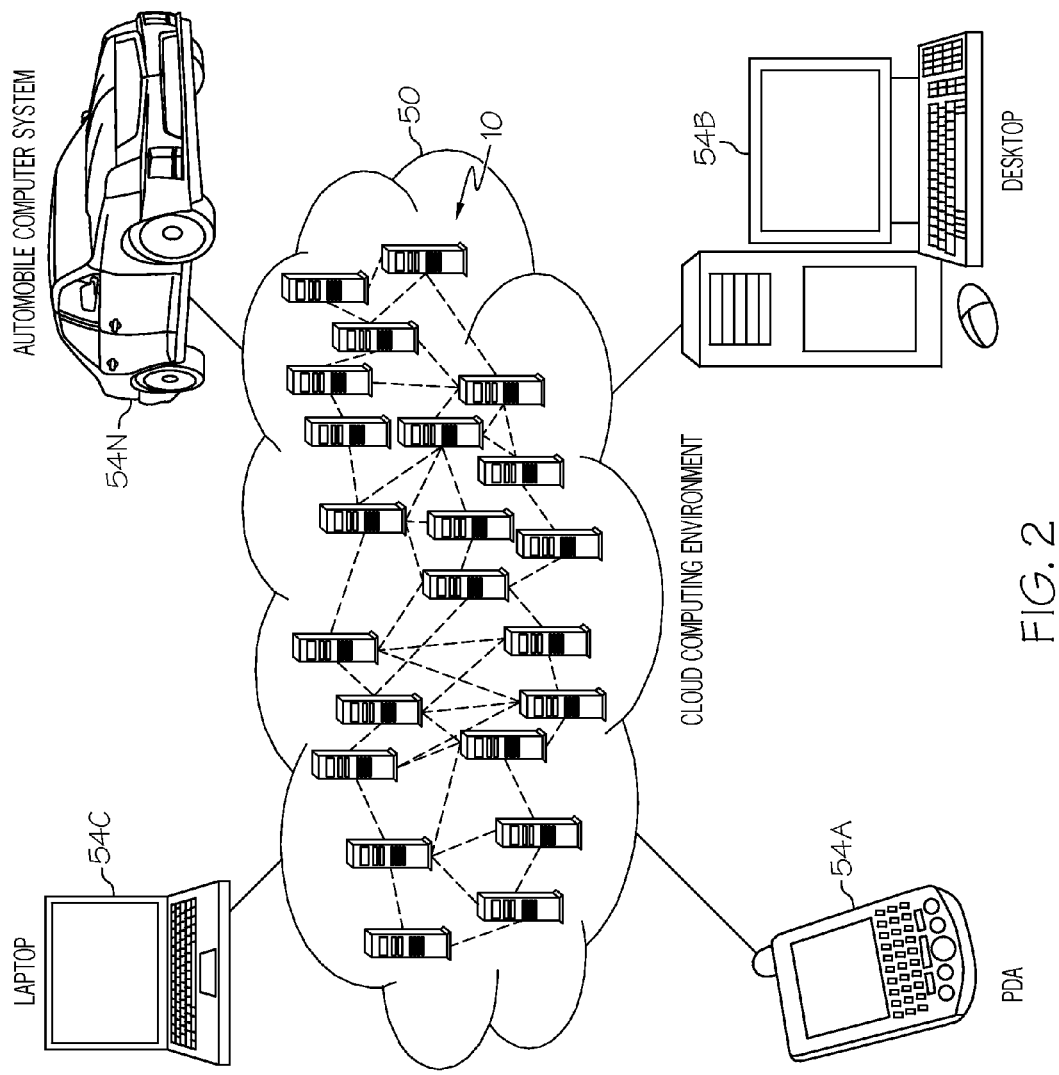
FIG. 2 shows a Cloud computing environment according to the present invention.

Referring now to FIG. 2, illustrative cloud computing environment 50 is depicted. As shown, cloud computing environment 50 comprises one or more cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms and/or software to be offered as services (as described above in Section I) from cloud computing environment 50 so as to not require each client to separately maintain such resources. It is understood that the types of computing devices 54A-N shown in FIG. 2 are intended to be illustrative only and that cloud computing environment 50 can communicate with any type of computerized device over any type of network and/or network/addressable connection (e.g., using a web browser).

Figure 3:
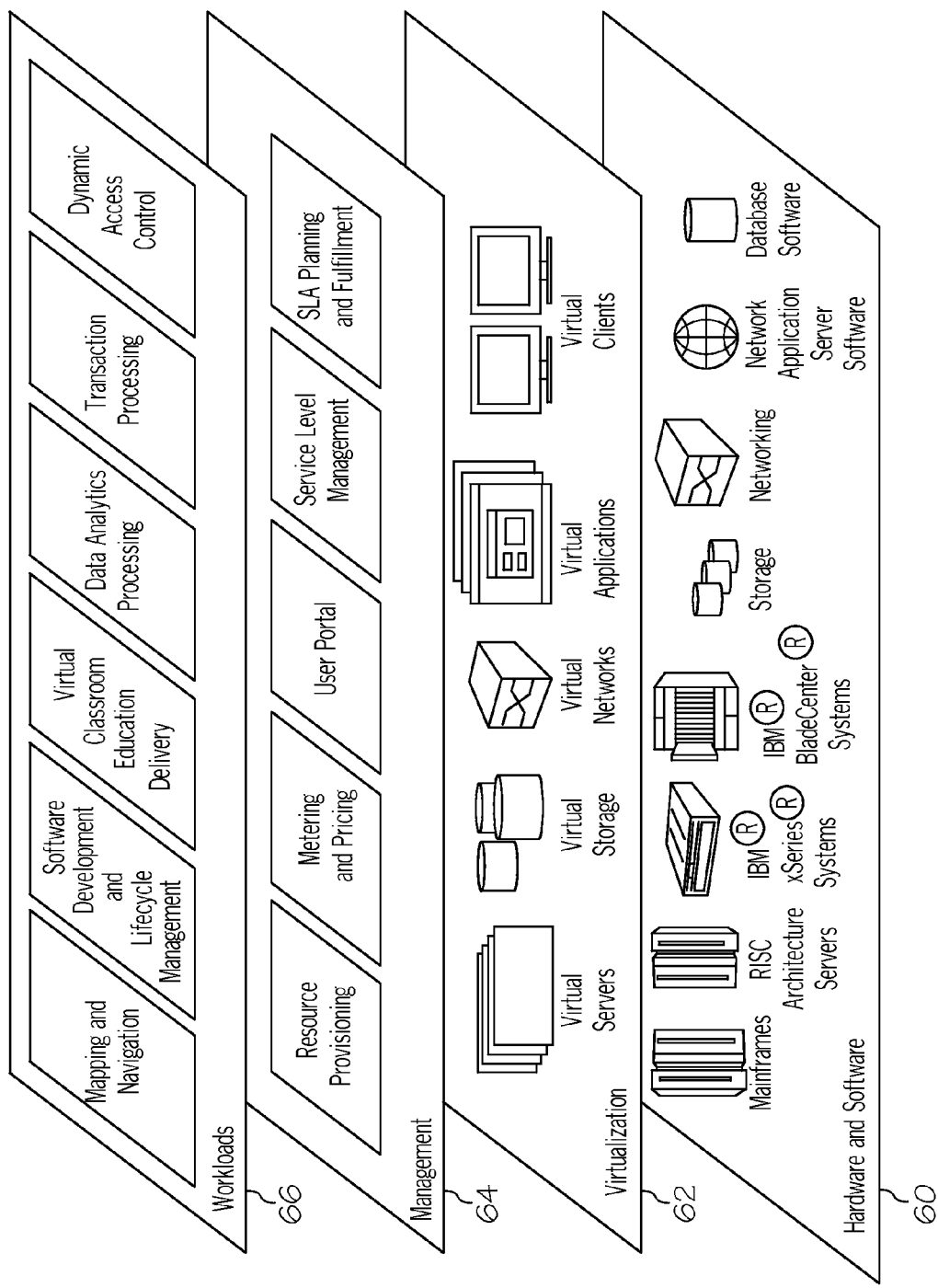
FIG. 3 shows Cloud abstraction model layers according to the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and the invention is not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for users and tasks, as well as protection for data and other resources. User portal provides access to the cloud computing environment for both users and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides functionality for which the cloud computing environment is utilized. Examples of workloads and functions which may be provided from this layer include: mapping and navigation; software development and lifecycle management; virtual classroom education delivery; data analytics processing; transaction processing; and dynamic access control.

Figure 4:
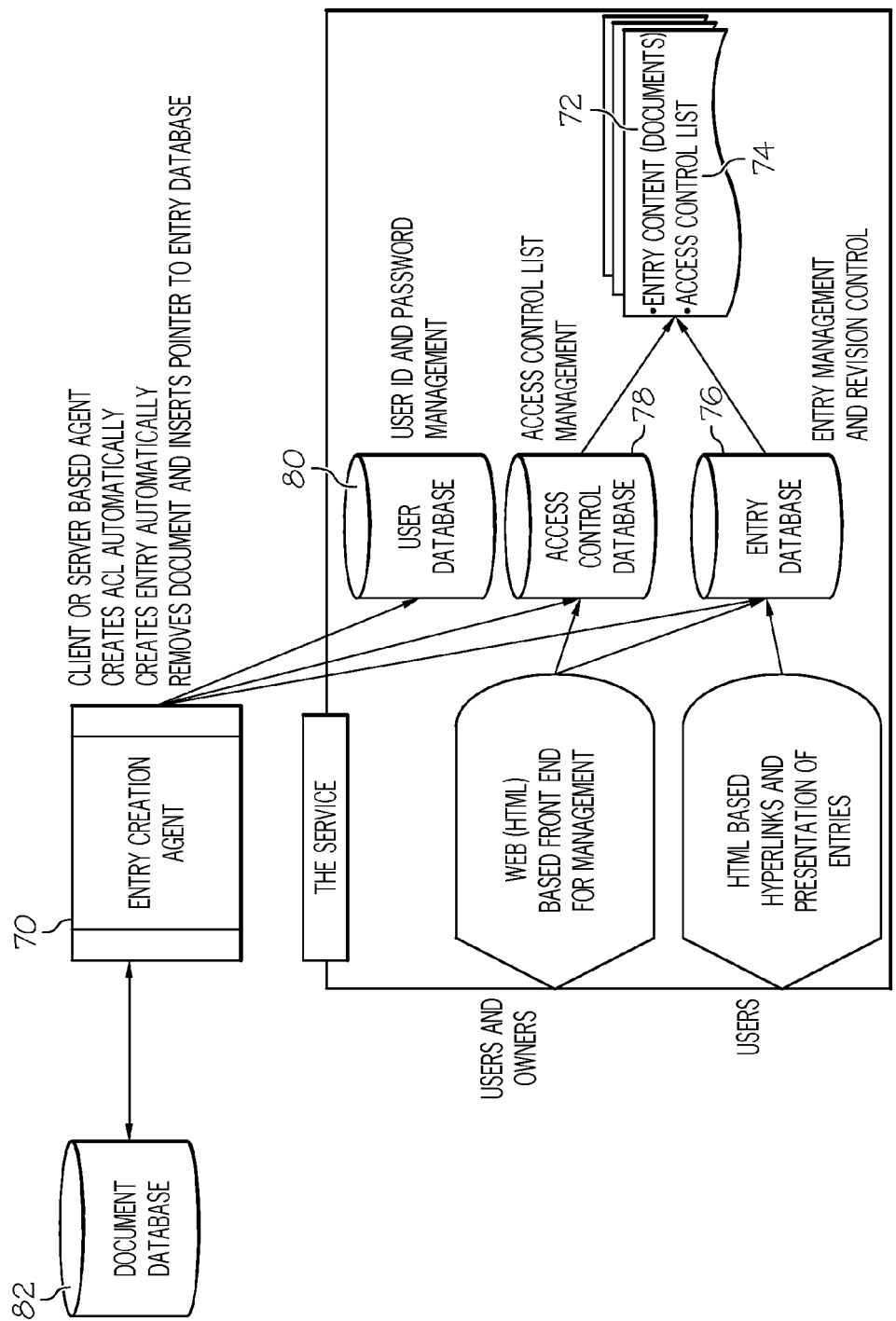
FIG. 4 shows an illustrative architectural diagram according to the present invention.

In general, dynamic access control functionality of workloads layer 66 implements the functions of the present invention as discussed herein in conjunction with FIGS. 4-5.

As mentioned above, the present invention provides a system that extracts documents from peer to peer (one-to-one or one-to-many) communication mediums (such as Cloud computing), and stores the documents in a centralized and widely accessible electronic repository. This invention may replace the document with a link to that centralized document store, send that link to both the originator/sender and recipient and, most importantly, create an access control list to the now secured document that is based on the addresses of the recipients and originator/sender to ensure a proper means of authorization for the message and/or attached document. The originator/sender then has the capability to manage the access control list for the document—no matter where the document has been sent to. Recipient may authenticate to the store that may be based on their address (or any other unique identifier such a private key, passcode, etc).

If one of the individuals on the recipient list has never used the system before, the central repository would automatically generate a password that would be sent as a separate communication. Users who are authenticated to the document store would have central access to all documents that are sent to them. In addition, the process enables central repositories of documents to be created to improve revision control and retention.

This invention may be implemented through the use of an agent or other code that performs automatic ACL updates and document to metadata conversion.

Use Cases

In accordance with these concepts, the following illustrative use cases can be implemented hereunder:

A service is created which provides database management functionality (entry creation, deletion, and editing) and access control management functionality including creation of user IDs, password management, user and password verification, password management (creation, reset and change). An agent intercepts communications and removes documents from the communication replacing with a pointer to an entry in the service.

(1) Send Mail with Imbedded Document to Multiple Recipients

An electronic mail is sent containing a document. The server agent processes the electronic mail, creates an entry on the service with an access control list based on the recipient and originator/sender. The agent then removes out each document and replaces the message with a hyperlink to each associated entry in the service.

The mail size is reduced by removing out any attachments, and network traffic is reduced outside of the client/server communication based on the document being stored in a central repository. The originator/sender of the document has control over recipients of the document in order to provide authentication and authorization services offered by the ACL.

This invention results in a more efficient and effective use of storage and bandwidth, increased document security and the document can be dynamically changed by the Owner and recipients of the document have access to the most recent version. The processing engine is shifted to the server agent to provide the necessary control of the document.

(2) Forward Mail which has Gone Through the Process to Multiple Different Recipients The agent determines that the electronic mail contains a pointer to an entry in the service and automatically updates the access control list of the entry to include the recipient of the electronic mail. The additions to the access control list of the entry are manageable by the owner of the entry and the originator/sender of this electronic mail.

Mail size is reduced, network traffic is reduced, the owner of the entry may monitor to whom the document has been sent, the originator/sender of the forwarded email can manage subsequent access to the document for the subset of users that were forwarded to.

(3) Instant Message Document to Recipient

As instant messaging as a form of electronic communication may become richer, and there may be a desire and need to share documents through this medium. The application of this invention may allow documents to be distributed effectively and efficiently to members of an instant messaging community.

The document may not require being stored locally, network bandwidth may be saved as only recipients with a need to view the material need access the entry. The access control lists of the document may enable the owner of the entry to determine who has access based on the access control lists. Version control of the document would remain current through the use of a central repository.

(4) Version Control of Distributed Documents

The owner of the entry is able to edit the contents of the entry. The database may store a change history of the document changes in the entry based on a unique identifier, enabling the most recent version of the document to be available to those in the access control list. The access control list and effective time-stamping may still be able to view previous versions (referred to in specific communications) of the document.

In the event that the recipient may need to update the document, the server agent may be able to create additional copies of the file based on the unique identifier. This may allow additional users to make changes to the original file and based on a certain set of parameters that the original file was sent under. Based on certain criteria, the original file may be restricted for editing or modification based on how closely the file resembles its original contents. Once the file has been updated or edited in any way, the server agent can then send out another electronic message to all of the recipients notifying them of the new change.

Another option is for the server agent to insert a piece of metadata into the file or file name to readily identify the changes and enforce version control of the file. This may allow better change control and collaboration between team members who may need access to the same document. The change control may need to be enforced based on the system that is being used between all parties such as the same forms of electronic communication, instant messaging, or peer-to-peer file sharing.

(5) Time Sensitivity

To manage the issue of time sensitivity and the sharing of documents, the centralized ACL services need to ensure that the central repository only allows access to the file or changes to the file based on a certain time criteria. This may have to include sensitivity to different time zones, work schedules, and intelligence to monitor for manipulation of timestamps to ensure that the system is not being taken advantage of.

(6) Cloud Computing

With a relative anonymity of Cloud computing, the need to manage the security and the sharing of documents is of utmost importance based on the relative lack of transparency on where the documents may be sent based on the availability of the Cloud infrastructure. Using the centralized ACL service or potentially a dedicated service, specifically for fine-grained authorization and access to specific documents, the central repository for managing these documents could mediate any lack of security within the Cloud as long as the centralized ACL or set of security services is aware of the different endpoints and clients do not need to be secured as part of the document management system.

This system is based on at least two parts:

1. A client or server-based agent automatically creates an access control list and entry in a database. The agent may run on a client mail or messaging system or on a mail or message server.

2. A service which provides display of entries in a database to users and the ability to manage user IDs, passwords, access control lists, and content of Entries.

Referring to FIG. 4, a logical/process flow diagram will be used to better describe the functions recited hereunder.

Agent and Service Function when Document is Found in Communication Process Flow:

Agent 70 intercepts an electronic communication (for example, a mail or instant message, hereafter referred to as "communication") containing a document (e.g., attached document).

An entry (Entry) 72 is created on the service for each document contained within the communication for storage in entry database 76. Ownership of the entry and the access control list 74 to the entry is assigned to the originator/sender of the communication.

An access control list 74 containing user IDs is created for the Entry 72 based upon the list of recipient destination addresses, and the originator/sender address is stored in an access control database 78. The user IDs are the recipient destination and originator/sender source addresses.

User IDs are either (1) verified (for user IDs recognized) or (2) created ("new" user ID) on the Service. For created user IDs:

An automatic password is created for these "new" electronic mail addresses.

Each "new" user ID on the access control list is sent a communication containing the user ID and automatically generated password, as well as details of how to change this password and verify the account and user ID for future access on the server. In any case, user IDs are stored and/or retrieved from user database 80.

The document contained within the communication is removed/extracted out, stored in document database 82, and replaced by a reference pointer (e.g., an electronic link) created on the service. This electronic link "points" to the location of document within document database 82 and/or entry 72 in entry database 76.

Recipients of the communication can access the document by referring to this pointer, validating their membership of the access control list by entering their user ID and password on the service.

Agent and Service Function when Pointer to Service is Found in Communication Process:

Mail is forwarded to a new set of recipients which contains a pointer to an entry 72 on the service.

The recipients of this new mail are added to the access control list 74 of the entry 72 on the Server, if the entry 72 on the server (e.g., computer system/server 12 of FIG. 1) is not "secured".

User ID validation and creation happens as per process outlined in above.

The owner of the entry 72 on the server is notified of a change to the access control list by electronic mail.

The owner of the entry 72 on the server can manage the access control list of the entry on the server per process described below.

The originator/sender of the forwarded mail can manage the subset of this additional access control list 74 per process described below.

In accordance with these concepts the following functionality can be provided:

Sharing an Entry Created by the Process with Others

The access control list for the entry on the service can be updated per the process described above. A new mail or communication referencing the pointer to the entry on the service can be sent separately to multiple recipients without the requirement for forwarding the initial communication mechanism (mail or instant message) and independent of the automatic generation of user IDs and access control lists.

Managing User IDs on the Service

User ID registration and the ability to password manage that user ID is open. User ID management would include the ability to register a "destination" or "origination" address, usually an electronic mail address, and create a user ID which is the same as this address.

Password management is available for the user ID:

Creation of a password for new user IDs on the service.

Resetting of a password for a user ID on the Service by transmitting an automatically generated password to the address.

Change of a password for a user ID by entry of existing password and new password.

Managing the Access Control List to the Entry on the Service

The owner of the entry on the service can edit the entire access control list of the Entry and add and remove user IDs from the access control list of the entry. Access control lists can be set to be "secured" to contain only the user IDs created for the entry and for user IDs added or modified by the owner of the entry. If an entry is distributed by a member of the access control list, that member can manage the subset of the user IDs referenced in that distribution. The subset can also be managed by the owner of the entry.

Managing the Content of the Entry on the Server

The owner of the entry on the service can edit the entry on the service, providing an updated document. The service would create a change log of the different versions of the document to enable users to determine which version of the document was referred to in a specific communication.

Referring now to FIG. 5, a method flow diagram according to the present invention is shown. In step S1, an electronic communication having a document (e.g., attached) is received. In step S2, the document is removed from the electronic communication. In step S3, the document is stored in a document database and a reference thereto is provided. In step S4, an access control list is generated for the attached document as stored, the access control list identifying a sender and a set of initial recipients of the electronic communication. In step S5, it is determined whether a user attempting to access the document is authorized (based on the access control list). If not, access is denied in step S6. If so, access is allowed in step S7 via an electronic reference such as a link.

While shown and described herein as a dynamic access control solution, it is understood that the invention further provides various alternative embodiments. For example, in one embodiment, the invention provides a computer-readable/useable medium that includes computer program code to enable a computer infrastructure to provide dynamic access control functionality as discussed herein. To this extent, the computer-readable/useable medium includes program code that implements each of the various processes of the invention. It is understood that the terms computer-readable medium or computer-useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a solution Integrator, could offer to provide dynamic access control. In this case, the service provider can create, maintain, support, etc., a computer infrastructure, such as computer system 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing dynamic access control functionality. In this case, a computer infrastructure, such as computer system 12 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly, or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for providing dynamic access control to documents in electronic communications within a networked computing environment, comprising:
   receiving an electronic communication within the networked computing environment, the electronic communication having a document;
   removing the document from the electronic communication;
   storing the document in a document database;
   adding to the electronic communication a pointer to an entry in the document database where the document is stored;
   generating an access control list for the document as stored, the access control list identifying a sender and a set of initial recipients of the electronic communication by a set of addresses of the sender and the set of initial recipients, the set of addresses being used to authorize access to the document in the document database;
   dynamically updating the access control list to include a set of forwarded recipients based upon a forwarding of the electronic communication by at least one of the set of initial recipients, wherein authority over inclusion to and removal from the access control list and authority to grant access to the document in the document database for the set of forwarded recipients is granted to one or more of the set of initial recipients who forwarded the electronic communication to the set of forwarded recipients;
   controlling access to the document in the document database based upon the access control list;
   receiving a set of changes to the document and storing the set of changes with a set of identifiers in a change history of the document;
   providing the sender and the initial and forwarded recipients with an updated version of the document based on an identifier of the set of identifiers at the entry in the document database where the document is stored;
   providing the sender and the initial recipients with access to an earlier version of the document associated with an earlier communication, the earlier version of the document being the document without the set of changes; and
   restricting modification to the earlier version of the document based on content of the earlier version of the document.

2. The computer-implemented method of claim 1, further comprising providing a reference to the document as stored in the repository.

3. The computer-implemented method of claim 2, the reference comprising an electronic link.

4. The computer-implemented method of claim 1, further comprising allowing management of a portion of the access control list representing the set of forwarded recipients by at least one of the set of initial recipients of the electronic communication.

5. The computer-implemented method of claim 1, the electronic communication being an electronic mail message.

6. The computer-implemented method of claim 1, the method comprising a Cloud service configured to work in conjunction with an electronic messaging application.

7. A networked computer system for providing dynamic access control to documents in electronic communications, comprising:
   a memory medium comprising instructions;
   a bus coupled to the memory medium; and
   a processor coupled to the bus that when executing the instructions causes the networked computer system to:
      receive an electronic communication within the networked computing environment, the electronic communication having a document;
      remove the document from the electronic communication;
      store the document in a document database;
      add to the electronic communication a pointer to an entry in the document database where the document is stored;
      generate an access control list for the document as stored, the access control list identifying a sender and a set of initial recipients of the electronic communication by a set of addresses of the sender and the set of initial recipients, the set of addresses being used to authorize access to the document in the document database;
      dynamically update the access control list to include a set of forwarded recipients based upon a forwarding of the electronic communication by at least one of the set of initial recipients, wherein authority over inclusion to and removal from the access control list and authority to grant access to the document in the document database for the set of forwarded recipients is granted to one or more of the set of initial recipients who forwarded the electronic communication to the set of forwarded recipients;
      control access to the document in the document database based upon the access control list;
      receive a set of changes to the document and storing the set of changes with a set of identifiers in a change history of the document;
      provide the sender and the initial and forwarded recipients with an updated version of the document based on an identifier of the set of identifiers at the entry in the document database where the document is stored;
      provide the sender and the initial recipients with access to an earlier version of the document associated with an earlier communication, the earlier version of the document being the document without the set of changes; and
      restrict modification to the earlier version of the document based on content of the earlier version of the document.

8. The networked computer system of claim 7, the networked computer system being further caused to provide a reference to the document as stored in the repository.

9. The networked computer system of claim 8, the reference comprising an electronic link.

10. The networked computer system of claim 7, the networked computer system being further caused to allow management of a portion of the access control list representing the set of forwarded recipients by at least one of the set of initial recipients of the electronic communication.

11. The networked computer system of claim 7, the electronic communication being an electronic mail message.

12. A computer readable storage device comprising a program product for providing dynamic access control to documents in electronic communications within a networked computing environment, the computer readable storage device comprising program code for causing a networked computer system to:
   receive an electronic communication within the Cloud computing environment, the electronic communication having a document;
   remove the document from the electronic communication;
   store the document in a document database;
   add to the electronic communication a pointer to an entry in the document database where the document is stored;
   generate an access control list for the document as stored, the access control list identifying a sender and a set of initial recipients of the electronic communication by a set of addresses of the sender and the set of initial recipients, the set of addresses being used to authorize access to the document in the document database;
   dynamically update the access control list to include a set of forwarded recipients based upon a forwarding of the electronic communication by at least one of the set of initial recipients, wherein authority over inclusion to and removal from the access control list and authority to grant access to the document in the document database for the set of forwarded recipients is granted to one or more of the set of initial recipients who forwarded the electronic communication to the set of forwarded recipients;
   control access to the document in the document database based upon the access control list;
   receive a set of changes to the document and storing the set of changes with a set of identifiers in a change history of the document;
   provide the sender and the initial and forwarded recipients with an updated version of the document based on an identifier of the set of identifiers at the entry in the document database where the document is stored;
   provide the sender and the initial recipients with access to an earlier version of the document associated with an earlier communication, the earlier version of the document being the document without the set of changes; and
   restrict modification to the earlier version of the document based on content of the earlier version of the document.

13. The computer readable storage device having the program product of claim 12, the computer readable storage device further comprising program code for causing the networked computer system to provide a reference to the document as stored in the repository.

14. The computer readable storage device having the program product of claim 13, the reference comprising an electronic link.

15. The computer readable storage device having the program product of claim 12, the computer readable storage device further comprising program code for causing the networked computer system to allow management of a portion of the access control list representing the set of forwarded recipients by at least one of the set of initial recipients of the electronic communication.

16. The computer readable storage device having the program product of claim 12, the electronic communication being an electronic mail message.

17. The computer-implemented method of claim 1, further comprising:
   authenticating a recipient to the document database based on a unique identifier of the recipient, the unique identifier being an address of the recipient; and
   providing the authenticated recipient access to a document sent to the authenticated recipient by adding the unique identifier of the recipient to the access control list for the document.

18. The networked computer system of claim 7, the networked computer system being further caused to:
   authenticate a recipient to the document database based on a unique identifier of the recipient, the unique identifier being an address of the recipient; and
   provide the authenticated recipient access to a document sent to the authenticated recipient by adding the unique identifier of the recipient to the access control list for the document.

19. The computer readable storage device having the program product of claim 12, the computer readable storage device further comprising program code for causing the networked computer system to:
   authenticate a recipient to the document database based on a unique identifier of the recipient, the unique identifier being an address of the recipient; and
   provide the authenticated recipient access to a document sent to the authenticated recipient by adding the unique identifier of the recipient to the access control list for the document.

20. The computer-implemented method of claim 17, wherein the sender is authorized to edit identifiers of the initial recipient on the access control list, and wherein the initial recipient is authorized to edit identifiers of forwarded recipients on the access control list.

* * * * *